United States Patent
Wolf et al.

(10) Patent No.: US 11,458,828 B2
(45) Date of Patent: Oct. 4, 2022

(54) METHOD FOR CONTROLLING AN INTERNAL COMBUSTION ENGINE OF A HYBRID POWERTRAIN

(71) Applicant: Schaeffler Technologies AG & Co. KG, Herzogenaurach (DE)

(72) Inventors: Daniel Wolf, Heroldsberg (DE); Piergiacomo Traversa, Tuchenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 61 days.

(21) Appl. No.: 16/768,089

(22) PCT Filed: Nov. 30, 2018

(86) PCT No.: PCT/DE2018/100976
§ 371 (c)(1),
(2) Date: May 29, 2020

(87) PCT Pub. No.: WO2019/110049
PCT Pub. Date: Jun. 13, 2019

(65) Prior Publication Data
US 2020/0307368 A1 Oct. 1, 2020

(30) Foreign Application Priority Data

Dec. 4, 2017 (DE) ...................... 10 2017 011 166.9
Jul. 18, 2018 (DE) ...................... 10 2018 117 360.1

(51) Int. Cl.
*F02D 41/00* (2006.01)
*B60K 6/24* (2007.10)
(Continued)

(52) U.S. Cl.
CPC .............. *B60K 6/24* (2013.01); *F01L 9/14* (2021.01); *F02D 13/0207* (2013.01);
(Continued)

(58) Field of Classification Search
CPC combination set(s) only.
See application file for complete search history.

(56) References Cited

U.S. PATENT DOCUMENTS 5,460,581 A * 10/1995 Ueda ..................... B60W 10/06
477/109
5,899,828 A 5/1999 Yamazaki
(Continued)

FOREIGN PATENT DOCUMENTS

CN 1991135 A * 7/2007 ............ F01L 1/3442
DE 102004013168 A1 10/2005
(Continued)

*Primary Examiner* — George C Jin
*Assistant Examiner* — Teuta B Holbrook

(57) ABSTRACT

The disclosure relates to a method for controlling an internal combustion engine configured with a belt starter generator or an electric machine of a hybrid powertrain. The internal combustion engine includes a cylinder and a piston, which together delimit a working chamber. The internal combustion engine includes a variable valve actuation system for actuation of inlet valves of the working chambers, controlling the opening time and/or the closing time and/or the lift. A strategy for operating the internal combustion engine with a negative drive torque or when shutting down or when starting up the internal combustion includes controlling the inlet valves of individual or all working chambers in such a way that the transfer of fresh air from an intake section to an exhaust manifold is controlled and that the drag torque of the internal combustion is reduced.

18 Claims, 4 Drawing Sheets

(51) Int. Cl.
    *F02D 13/02*     (2006.01)
    *F02D 41/04*     (2006.01)
    *F02D 41/06*     (2006.01)
    *F01L 9/14*     (2021.01)

(52) U.S. Cl.
    CPC ....... *F02D 41/009* (2013.01); *F02D 41/0047* (2013.01); *F02D 41/042* (2013.01); *F02D 41/062* (2013.01)

(56) References Cited

U.S. PATENT DOCUMENTS

| | | | |
|---|---|---|---|
| 6,647,955 B1 | 11/2003 | Sieber | |
| 7,899,608 B1 * | 3/2011 | Pederson | G01M 15/11 701/111 |
| 8,447,499 B2 * | 5/2013 | Gentile | F01L 9/14 123/90.6 |
| 8,909,460 B2 * | 12/2014 | Lucatello | F02D 13/0269 123/481 |
| 2002/0007808 A1 * | 1/2002 | Moriya | F01L 13/0042 123/90.1 |
| 2002/0043243 A1 | 4/2002 | Majima | |
| 2002/0115532 A1 * | 8/2002 | Wakashiro | B60W 10/04 903/905 |
| 2003/0164163 A1 * | 9/2003 | Lei | F02M 26/01 60/602 |
| 2004/0074481 A1 * | 4/2004 | Geiser | F02D 13/0261 123/90.15 |
| 2004/0173170 A1 * | 9/2004 | Gaessler | F02B 75/12 123/64 |
| 2005/0205049 A1 | 9/2005 | Lewis | |
| 2005/0279323 A1 * | 12/2005 | Lewis | F01L 13/0005 123/321 |
| 2007/0006831 A1 | 1/2007 | Leone et al. | |
| 2009/0152027 A1 * | 6/2009 | Kusaka | B60L 50/16 180/65.28 |
| 2010/0121558 A1 * | 5/2010 | Gentile | F01L 1/08 123/90.12 |
| 2011/0313643 A1 * | 12/2011 | Lucatello | F02D 13/0261 123/90.12 |
| 2013/0080036 A1 | 3/2013 | Yamauchi et al. | |
| 2013/0325233 A1 * | 12/2013 | Whitney | B60K 6/52 701/22 |
| 2014/0190426 A1 | 7/2014 | Carvignese et al. | |
| 2014/0202406 A1 * | 7/2014 | Nakamura | F01L 1/46 123/90.15 |
| 2015/0166037 A1 * | 6/2015 | Bergkoetter | F02D 13/06 477/181 |
| 2016/0244064 A1 * | 8/2016 | Teraya | B60W 10/06 |
| 2016/0264129 A1 * | 9/2016 | Kato | B60K 6/442 |
| 2016/0288784 A1 * | 10/2016 | Teraya | B60K 6/442 |
| 2017/0001625 A1 * | 1/2017 | Kato | B60W 10/26 |

FOREIGN PATENT DOCUMENTS

| | | |
|---|---|---|
| DE | 102006031572 A1 | 1/2007 |
| DE | 102010041519 B3 | 12/2011 |
| DE | 102018117359 A1 | 6/2019 |
| DE | 102018117360 A1 | 6/2019 |
| EP | 2578462 A1 | 4/2013 |
| JP | 2012067631 A * | 4/2012 |
| WO | 2019110048 A1 | 6/2019 |

* cited by examiner

METHOD FOR CONTROLLING AN INTERNAL COMBUSTION ENGINE OF A HYBRID POWERTRAIN

CROSS-REFERENCE TO RELATED APPLICATIONS

This application is the U.S. National Phase of PCT Application No. PCT/DE2018/100976 filed on Nov. 30, 2018 which claims priority to DE 10 2017 011 166.9 filed on Dec. 4, 2017 and DE 10 2018 117 360.1 filed on Jul. 18, 2018, the entire disclosures of which are incorporated by reference herein.

TECHNICAL FIELD

This disclosure relates to a method for controlling an internal combustion engine of a powertrain, comprising a belt starter generator or an electric machine of a hybrid powertrain for starting up the internal combustion engine.

BACKGROUND

Such a method is disclosed for example in EP 2 578 462 A1. A method is described for reducing pumping losses of an internal combustion engine, which is used in a hybrid powertrain with a belt starter generator. Pumping losses are reduced while the internal combustion engine is in the shutdown state.

SUMMARY

The object of the disclosure is to propose a method which optimizes the operation of the internal combustion engine during a stop-start phase.

The object is achieved by the features described herein. According to the disclosure, the following strategy is used when operating the internal combustion engine with a negative drive torque and/or when shutting down and/or when starting up the internal combustion engine. The inlet valves of individual or all working chambers are controlled in such a way that the transfer of fresh air from the intake system to the exhaust manifold is controlled and that the drag torque of the internal combustion engine is reduced.

A hybrid powertrain is understood to mean a powertrain of a hybrid vehicle. A hybrid vehicle is a vehicle with at least two different energy converters and two different energy storage systems (in the vehicle) for the purpose of driving the vehicle, in particular in a P0 arrangement (belt-starter-generator), P1 arrangement (electric machine between internal combustion engine and transmission) and P2 (electric machine between clutch and gearbox).

An operation of the internal combustion engine with a negative drive torque is understood to mean operation in a passive phase of the engine or as operation with an applied thrust torque, such as when the engine is used as a brake. The drag torque of the internal combustion engine is understood to mean the resistance that is caused by the frictional moving parts of the internal combustion engine and by the pushing and pulling of gases from/to a working chamber or combustion chamber (pumping losses).

Over-supplying the catalyst with fresh air can advantageously be avoided. An excessive fresh air supply means that fuel is injected to set the required air ratio by means of a mixture regulator to achieve the optimum air ratio. Avoiding or reducing fresh air transfer can result in reduced fuel consumption during the stop-start procedure. Another advantage is that drag torques are reduced. In particular, this can improve the comfort of the stop-start process.

In addition, fresh air can be directed into the exhaust system.

An advantageous further development relates to a method in which the transfer of fresh air from the intake system to the exhaust manifold is controlled and the drag torque caused by the resistance of the piston movement is reduced. This can be accomplished by: 1) opening the inlet valves of individual or all of the working chambers at a point in time when the piston assigned to the working chamber is in the exhaust stroke; 2) closing the inlet valves of individual or all working chambers at a point in time when the piston is in the inlet stroke, wherein the inlet stroke is not completed; or, 3) closing the inlet valves of individual or all working chambers at a point in time where the piston is in the compression stroke, wherein the compression stroke is not completed. The two characteristic lift curves of the inlet valve show alternative ways to achieve the goals that the strategy is pursuing.

An advantageous development relates to a method in which the reduction in the drag torque of the internal combustion engine is compensated for by the drag torque which is caused by the use of the electric machine as a generator. Braking energy can thus be recuperated in an advantageous manner without impairing driving comfort.

An advantageous development relates to a method in which the internal combustion engine is driven by the electric machine (used as a motor) when starting up and in which the inlet valves of individual or all working chambers are controlled in such a way that the transfer of fresh air from the intake system to the exhaust manifold is reduced or avoided and that the drag torque of the internal combustion engine is reduced. Advantages are particularly evident when switching on the internal combustion engine—the internal combustion engine must be accelerated to a target speed above the idling speed. The proposed method enables the target speed to be reached more quickly and the energy requirement to be optimized.

An advantageous development relates to a method in which the internal combustion engine is initially started up and the drag torque caused by the resistance is reduced by opening the inlet valves of individual or all of the working chambers at a point in time when the piston associated with the working chamber is in the exhaust stroke. Additionally, the drag torque can be reduced by closing the inlet valves of individual or all of the working chambers at a point in time when the piston is in the intake stroke, the intake stroke not being completed. An initial start-up is understood to mean that there is excessive fresh air in the catalytic converter—for example after a long standstill or a long drive exclusively in the electrical operating state.

BRIEF DESCRIPTION OF THE DRAWINGS

The disclosure is explained below in the drawings.

DETAILED DESCRIPTION OF THE EMBODIMENTS

Figure 1:
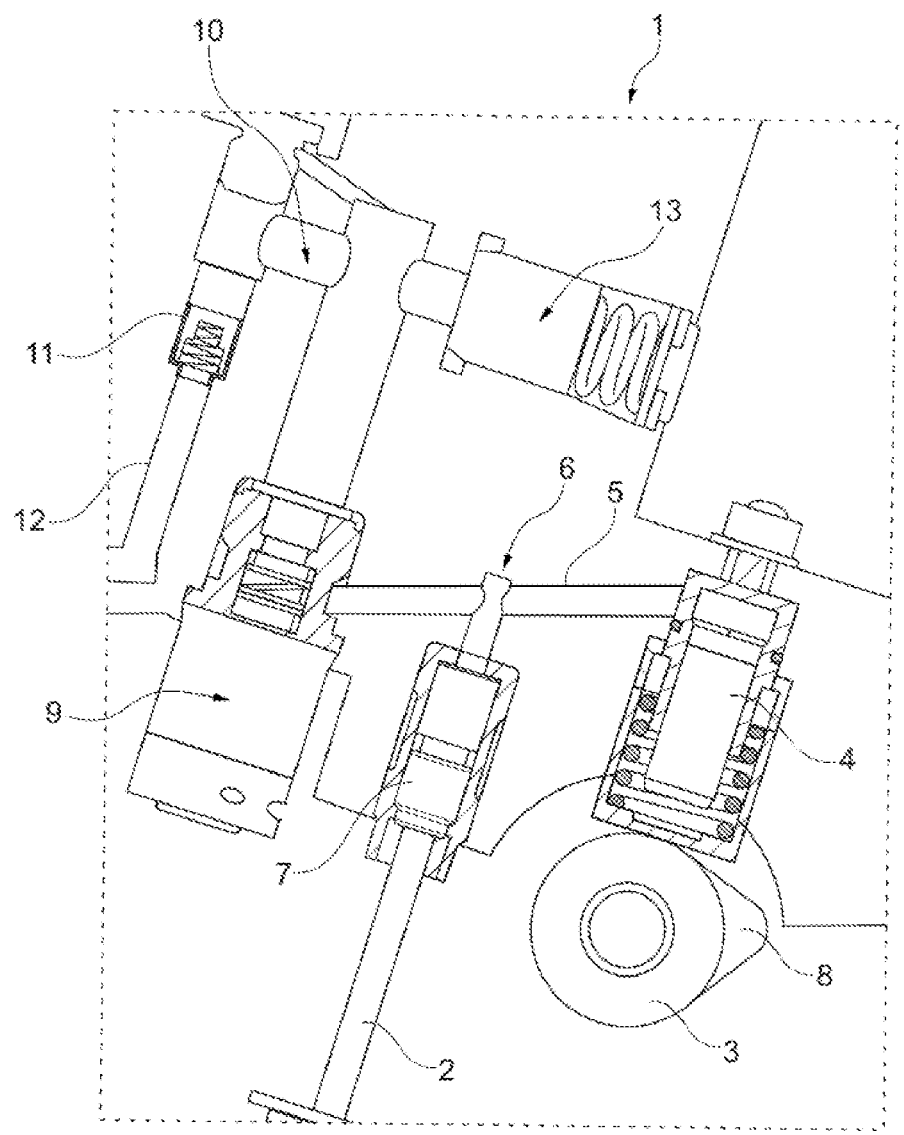
FIG. 1 shows a schematic representation of the structure of an electro-hydraulic valve train for variable actuation of the inlet valves of an internal combustion engine.

FIG. 1 shows a schematic representation of the structure 1 of an electro-hydraulic valve train for variable actuation of the inlet valves of an internal combustion engine. Inlet valves 2 can be controlled in such a way that the opening time, the closing time, and the lift can be changed. A camshaft 3 drives a master piston 4, which is connected to a slave piston 7 via a hydraulic medium line 5 of a high-pressure chamber 6. The movement caused by a cam 8 of the camshaft 3 can be transmitted to an inlet valve 2 via the master piston 4, the hydraulic support in the high-pressure chamber 6, and the slave piston 7.

An electromagnetic switching valve 9 designed as a 2-2-way valve establishes a controllable hydraulic connection between the high-pressure chamber 6 and a medium-pressure chamber 10. When the switching valve 9 is open, hydraulic medium can flow from the high-pressure chamber 6 into the medium-pressure chamber 10. The medium pressure chamber 10 is connected to the general hydraulic medium circuit 12 of the internal combustion engine via a hydraulic medium line secured by a check valve 11. The medium pressure chamber 10 is connected to a piston pressure accumulator 13.

The variability of the opening time, the closing time, and the lift of the gas exchange valve 2 is accordingly achieved by hydraulic coupling and decoupling that occurs between the cam 8 of the camshaft 3 and the gas exchange valve 2. The hydraulic coupling is provided by the high-pressure chamber 6, filled with hydraulic medium, between the master piston 4 and the slave piston 7—the high-pressure chamber 6 thus acts as what is termed a hydraulic linkage. The displacement of hydraulic medium caused by the cam contour and implemented by means of master piston 4 acts—with a closed switching valve 9 and negligible leakage—proportional to the movement of the gas exchange valve 2 caused by the movement of the slave piston 7. The movement of the gas exchange valve 2 can be controlled in that a partial volume of the hydraulic medium is transferred from the high-pressure chamber 6 to the medium-pressure chamber 10 by deliberately opening the switching valve 9. The movement of the gas exchange valve 2 is no longer proportional to the contour profile of the cam 8, but can take any shape.

Figure 2:
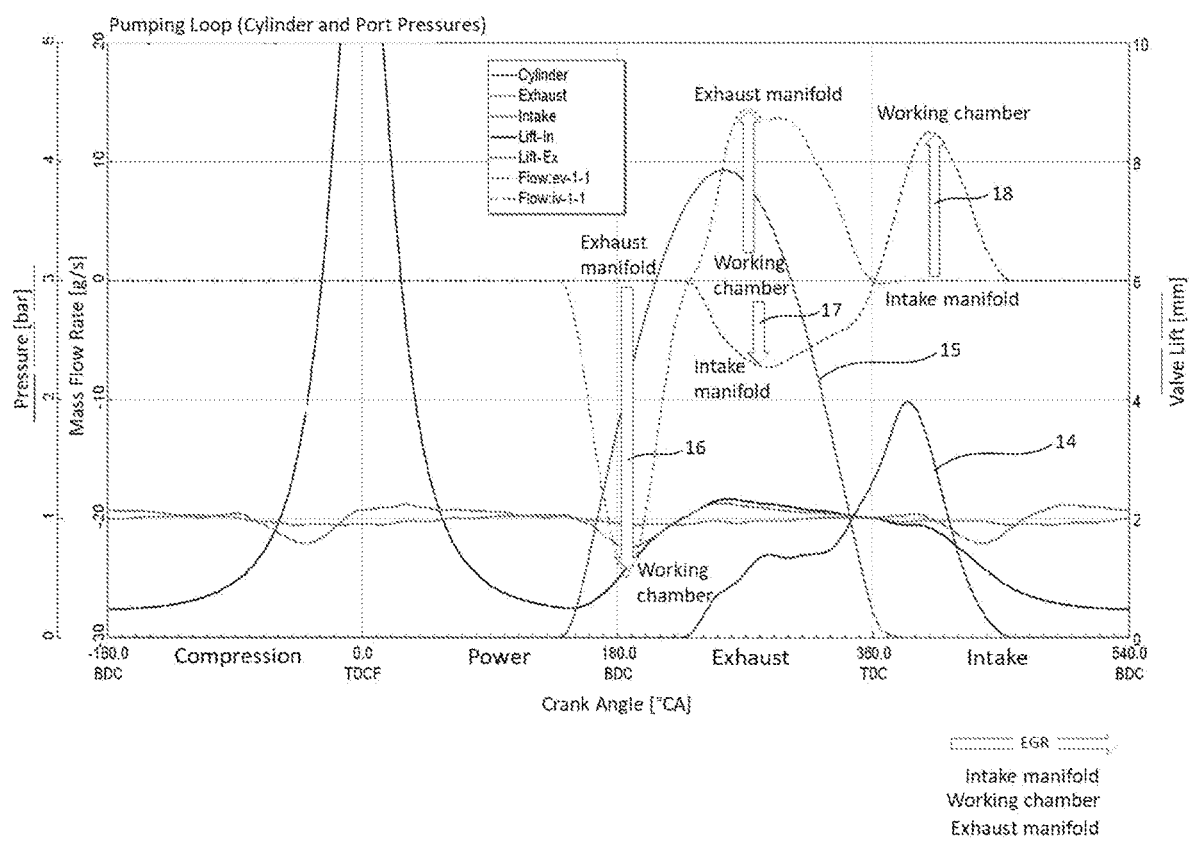
FIG. 2 shows a first characteristic valve lift curve of an inlet valve.

A first characteristic valve lift curve of an inlet valve is shown in FIG. 2. The axis of rotation of the crankshaft is shown on the abscissa axis, wherein two complete revolutions of the crankshaft are recorded. The piston then moves between bottom dead center BDC and top dead center TDC, with the internal combustion engine going through the compression (ignition), power, exhaust, and intake strokes. The valve lift and the gas mass flow are plotted on the ordinate axis.

Line 14 illustrates the valve lift curve of inlet valve 2. Inlet valve 2 opens during the exhaust stroke, at approximately 50° crankshaft angle after bottom dead center BDC. A first valve lift of the valve lift curve amounts to approximately 1.5 mm that dwells or plateaus near this lift up to approximately 30° crankshaft angle before reaching top dead center TDC and is therefore relatively small in comparison with the maximum lift. Then the valve lift curve increases to a second valve lift of 4 mm, for example. The inlet valve closes at approximately 460° crankshaft angle during the intake stroke before bottom dead center BDC is reached.

Line 15 illustrates the valve lift curve of the exhaust valve. The exhaust valve opens during the power stroke, at a 140° crankshaft angle, i.e., shortly before BDC is reached. The exhaust valve closes at the end of the exhaust stroke in the area of top dead center TDC. Together with the lift characteristics of the inlet valve, a mass flow is created between the exhaust manifold, the working chamber of the cylinder, and the intake manifold. The mass flow between the exhaust manifold and the working chamber of the cylinder is illustrated by flow arrow 16, and the mass flow between the working chamber of the cylinder and the intake manifold by flow arrow 17. Flow arrow 18 illustrates the mass flow between the intake manifold and the working chamber. This course shows that exhaust gas is transferred from the exhaust manifold into the intake manifold, whereby exhaust gas recirculation is realized and a transfer of fresh air or a fresh intake charge from the intake manifold to the exhaust manifold is avoided or at least reduced. Pumping losses are also reduced, which reduces the drag torque caused by the internal combustion engine.

Figure 3:
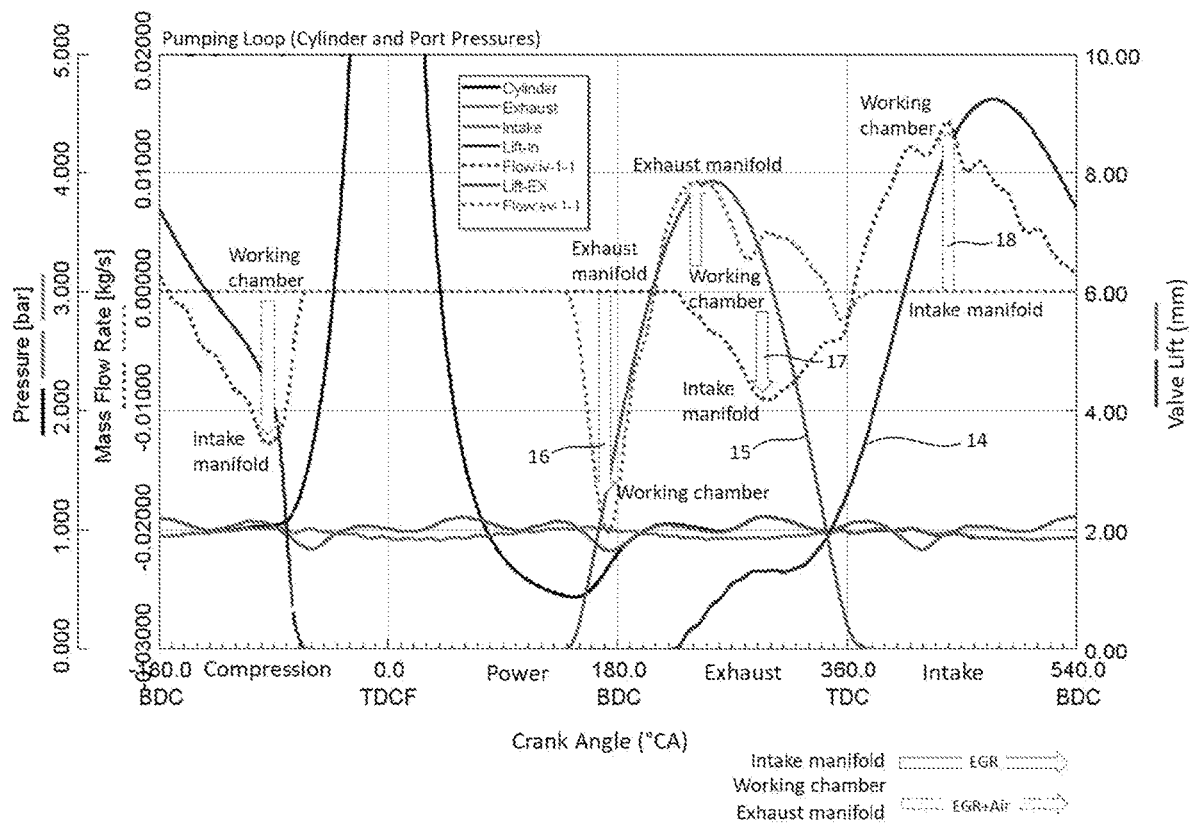
FIG. 3 shows a second characteristic valve lift curve of an inlet valve.

A second characteristic valve lift curve of an inlet valve 2 is shown in FIG. 3. The lift curves of the intake and exhaust valves largely correspond to the curves shown in FIG. 2. However, the inlet valve closes at a −60° crankshaft angle shortly before top dead center TDC during the compression stroke. The maximum lift of the inlet valve also differs from the lift shown in FIG. 2 and is approximately 9 mm. The first characteristic valve lift curve is advantageous compared to the second characteristic valve lift curve with a view to reducing the transfer of fresh air from the intake manifold to the exhaust manifold; the second characteristic valve lift curve is advantageous compared to the first characteristic valve lift curve with a view to reducing drag torque.

The transfer of fresh air from the intake manifold to the exhaust manifold is accordingly reduced or avoided and the drag torque caused by the resistance of the piston movement is reduced by: 1) opening the inlet valves of individual or all working chambers at a point in time when the piston associated with the working chamber is in the exhaust stroke; 2) closing the inlet valves of individual or all working chambers at a point in time when the piston is in the intake stroke, such that the intake stroke is not yet completed; or, 3) by closing the inlet valves of individual or all working chambers at a time when the piston is in the compression stroke, such that the compression stroke is not yet completed.

Figure 4A:
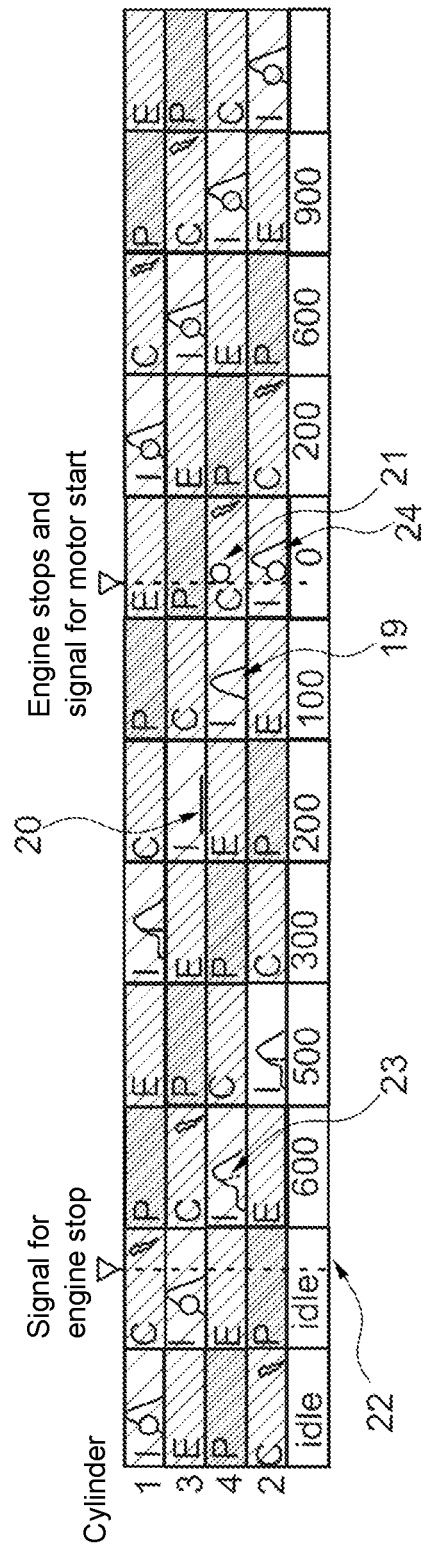
FIG. 4a shows a first method for shutting down and starting up an internal combustion engine.

FIG. 4a illustrates a method for controlling an internal combustion engine of a powertrain, which comprises a belt starter generator or an electric machine of a parallel hybrid powertrain, at least for starting up the internal combustion engine. The following strategy is used when operating the internal combustion engine with a negative drive torque, i.e., in passive or overrun mode, when shutting down or when starting up the internal combustion engine. The inlet valves are controlled in such a way that either the first characteristic valve lift curve or the second characteristic valve lift curve is established. As a result, the transfer of fresh air from the intake manifold to the exhaust manifold is reduced or avoided and the drag torque caused by the resistance of the piston movement is reduced.

The reduction in the drag torque of the internal combustion engine can be compensated for by the drag torque which is caused by the use of the electric machine as a generator.

The use of the described strategy thus enables energy to be recovered, for example, during the braking process, referred to as regenerative braking, so that braking energy is recuperated. The start-up can take place via use of the electric machine as a motor, the inlet valves of individual or all working chambers being controlled in such a way that the transfer of fresh air from the intake system to the exhaust manifold is reduced or avoided and that the drag torque caused by the resistance of the piston movement is reduced.

In an instance when the internal combustion engine is initially started up after a long standstill, it is not at operating temperature. To avoid excessive fresh air transfer to the exhaust manifold, the following strategy is used: the inlet valves of individual or all working chambers are opened at a point in time when the piston assigned to the working chamber is in the exhaust stroke and the inlet valves of individual or all working chambers are closed at a point in time where the piston is in the intake stroke, with the intake stroke not yet being completed.

Figure 4B:
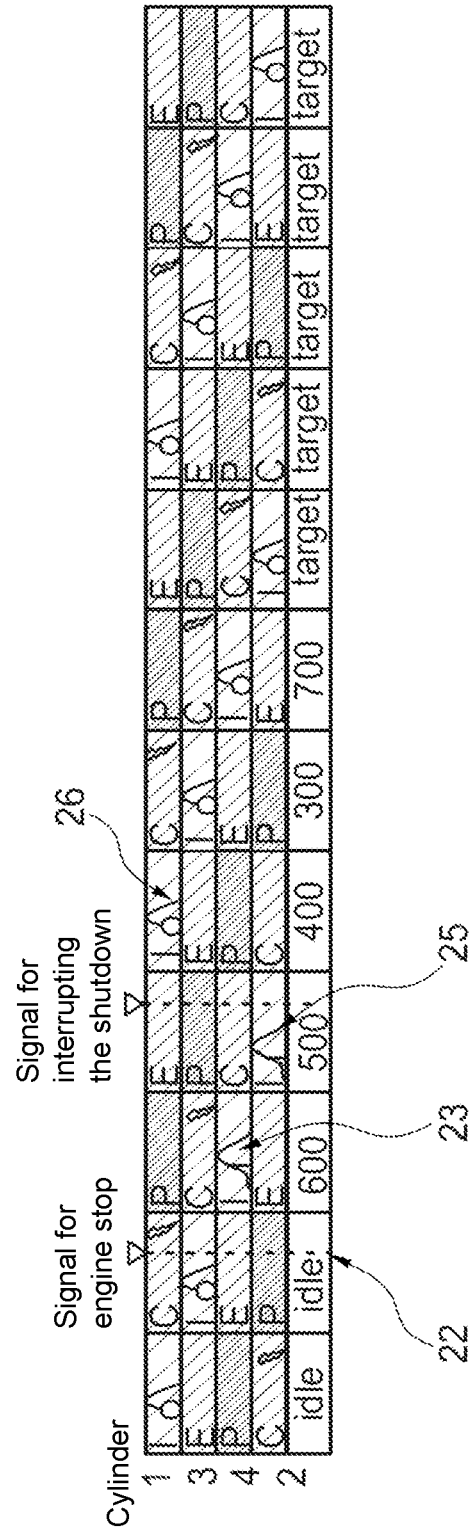
FIG. 4b shows a second method for shutting down and starting up an internal combustion engine in situations in which the internal combustion engine has been in the shutdown state for a long time.

FIG. 4b shows a second method for shutting down and starting up an internal combustion engine in situations in which the internal combustion engine has been in the shutdown state for a long time. In contrast to the strategy shown in FIG. 4a, the engine does not undergo ignition immediately after the engine is started. The engine is motored to the requested speed using a valve lift curve that can be used to reduce the drag torque (see point 27). In this way, the electric motor can be designed efficiently.

Regarding other points of the strategy, the following description is provided:

Point 23: Control of the inlet valve according to the first characteristic valve lift curve (FIG. 2) or after the second characteristic valve lift curve (FIG. 3);

Point 24: The type of control of the inlet valve is determined during engine stop.

Point 27: Valve lift curve to reduce the drag torque.

LIST OF REFERENCE CHARACTERS 1 electro-hydraulic valve train for variable actuation of the inlet valves
2 inlet valve
3 camshaft
4 master pistons
5 hydraulic medium line
6 high pressure chamber
7 slave pistons
8 cams
9 switching valve
10 medium pressure chamber
11 check valve
12 hydraulic medium circuit
13 piston pressure accumulators
14 line
15 line
16 flow arrow
17 flow arrow
18 flow arrow
19 Second working chamber filled with fresh air
20 Checking the end position when the engine stops
21 Starting the engine
22 Calculation of the kinetic energy
23 Control of the inlet valve
24 Determination of control after engine start
25 Intake charge with an excessive amount of exhaust gas
26 Determination of control after engine start
27 Valve lift curve to reduce the drag torque BDC bottom dead center
TDC top dead center

The invention claimed is:

1. A method for controlling an internal combustion engine of a powertrain, the internal combustion engine having a plurality of working chambers defined by a plurality of cylinders and a plurality of pistons, the method comprising:
   providing:
      one of either a belt starter generator or an electric machine, each configured to start the internal combustion engine;
      a first cylinder:
      a first piston configured to move within the first cylinder, the first piston and the first cylinder defining a first working chamber, and the first working chamber configured to be fluidly connected to both an intake manifold via an inlet valve, and an exhaust manifold via an exhaust valve; and
      a variable valve actuation system configured to control at least one of an opening time, a closing time, or a valve lift of an inlet valve lift curve; and
   changing the inlet valve lift curve to a first inlet valve lift curve during a time when the internal combustion engine is driven by one of the electric machine or the belt starter generator, the first inlet valve lift curve defining a first inlet valve opening event having a first valve lift and a second valve lift greater than the first valve lift.

2. The method of claim 1, wherein the changing the inlet valve lift curve to the first inlet valve lift curve occurs during start-up of the internal combustion engine.

3. The method of claim 1, wherein the first valve lift occurs during an exhaust stroke and the second valve lift occurs during an intake stroke, the exhaust stroke and intake stroke defining two strokes of a four-stroke engine cycle of the internal combustion engine.

4. The method of claim 3, wherein the first valve lift is smaller than the second valve lift.

5. The method of claim 4, wherein the first valve lift is smaller than a valve lift of the exhaust valve.

6. The method of claim 1, wherein the first inlet valve lift curve defines a closing of the inlet valve before a bottom dead center position of the first piston within an intake stroke of a four-stroke engine cycle of the internal combustion engine.

7. The method of claim 1, wherein the first inlet valve lift curve defines a closing of the inlet valve at a first piston location of less than 90 crank angle degrees from a top dead center position of the first piston in a compression stroke of a four-stroke engine cycle of the internal combustion engine.

8. The method of claim 1, wherein the first inlet valve lift curve defines an opening of the inlet valve at a first piston location of less than 90 crank angle degrees from a bottom dead center position of the first piston in an exhaust stroke of a four-stroke engine cycle of the internal combustion engine.

9. The method of claim 1, wherein the first inlet valve lift curve defines an inlet valve opening at a first crankshaft angle and a maximum lift of the exhaust valve occurs at a second crankshaft angle, the first crankshaft angle occurring before the second crankshaft angle within an exhaust stroke of a four-stroke cycle of the internal combustion engine.

10. A method for controlling an internal combustion engine of a hybrid powertrain, the internal combustion engine having a plurality of working chambers, and each of the plurality of working chambers defined by one of a plurality of cylinders configured to receive one of a plurality of pistons, the method comprising:

providing:
one of either a belt starter generator or an electric machine, each configured to start the internal combustion engine;
a first cylinder;
a first piston configured to move within the first cylinder, the first piston and the first cylinder defining a first working chamber, and the first working chamber configured to cooperate with the first piston, an inlet valve, and an exhaust valve to fulfill a gas exchange process for the internal combustion engine; and
a variable valve actuation system configured to control at least one of an opening time, a closing time, or a valve lift of an inlet valve lift curve; and
changing the inlet valve lift curve to a first inlet valve lift curve when the internal combustion engine is driven by one of the electric machine or the belt starter generator, the first inlet valve lift curve defining a first inlet valve opening event having:
a first valve lift;
a second valve lift different than the first valve lift; and
a plateau arranged between the first and second valve lifts.

11. The method of claim 10, wherein the first inlet valve lift curve increases an amount of exhaust gas recirculation delivered to the at least one of the plurality of working chambers.

12. A method for controlling an internal combustion engine of a hybrid powertrain, the internal combustion engine having a plurality of working chambers, and each of the plurality of working chambers defined by one of a plurality of cylinders configured to receive one of a plurality of pistons, the method comprising:

providing:
one of either a belt starter generator or an electric machine, each configured to start the internal combustion engine;
a first cylinder;
a first piston configured to move within the first cylinder, the first piston and the first cylinder defining a first working chamber, and the first working chamber configured to cooperate with the first piston, an inlet valve, and an exhaust valve to fulfill a gas exchange process for the internal combustion engine; and
a variable valve actuation system configured to control at least one of an opening time, a closing time, or a valve lift of an inlet valve lift curve; and
changing the inlet valve lift curve to a first inlet valve lift curve during a time when one of the belt starter generator or the electric machine is used as a generator during a regenerative braking mode, the first inlet valve lift curve defining a first inlet valve opening event having a first valve lift and a second valve lift different than the first valve lift.

13. The method of claim 12, wherein the first valve lift occurs during an exhaust stroke and the second valve lift occurs during an intake stroke, the exhaust stroke and intake stroke defining two strokes of a four-stroke engine cycle of the internal combustion engine.

14. The method of claim 12, wherein the first valve lift is smaller than a valve lift of the exhaust valve.

15. The method of claim 12, wherein the first inlet valve lift curve defines a closing of the inlet valve before a bottom dead center position of the first piston within an intake stroke of a four-stroke engine cycle of the internal combustion engine.

16. The method of claim 12, wherein the first inlet valve lift curve defines a closing of the inlet valve at a first piston location of less than 90 crank angle degrees from a top dead center position of the first piston in a compression stroke of a four-stroke engine cycle of the internal combustion engine.

17. The method of claim 12, wherein the first inlet valve lift curve defines an opening of the inlet valve at a first piston location of less than 90 crank angle degrees from a bottom dead center position of the first piston in an exhaust stroke of a four-stroke engine cycle of the internal combustion engine.

18. The method of claim 12, wherein the first inlet valve lift curve defines an inlet valve opening at a first crankshaft angle, and a maximum lift of the exhaust valve occurs at a second crankshaft angle, the first crankshaft angle occurring before the second crankshaft angle within an exhaust stroke of a four-stroke cycle of the internal combustion engine.

* * * * *